United States Patent Office 3,526,763
Patented Sept. 1, 1970

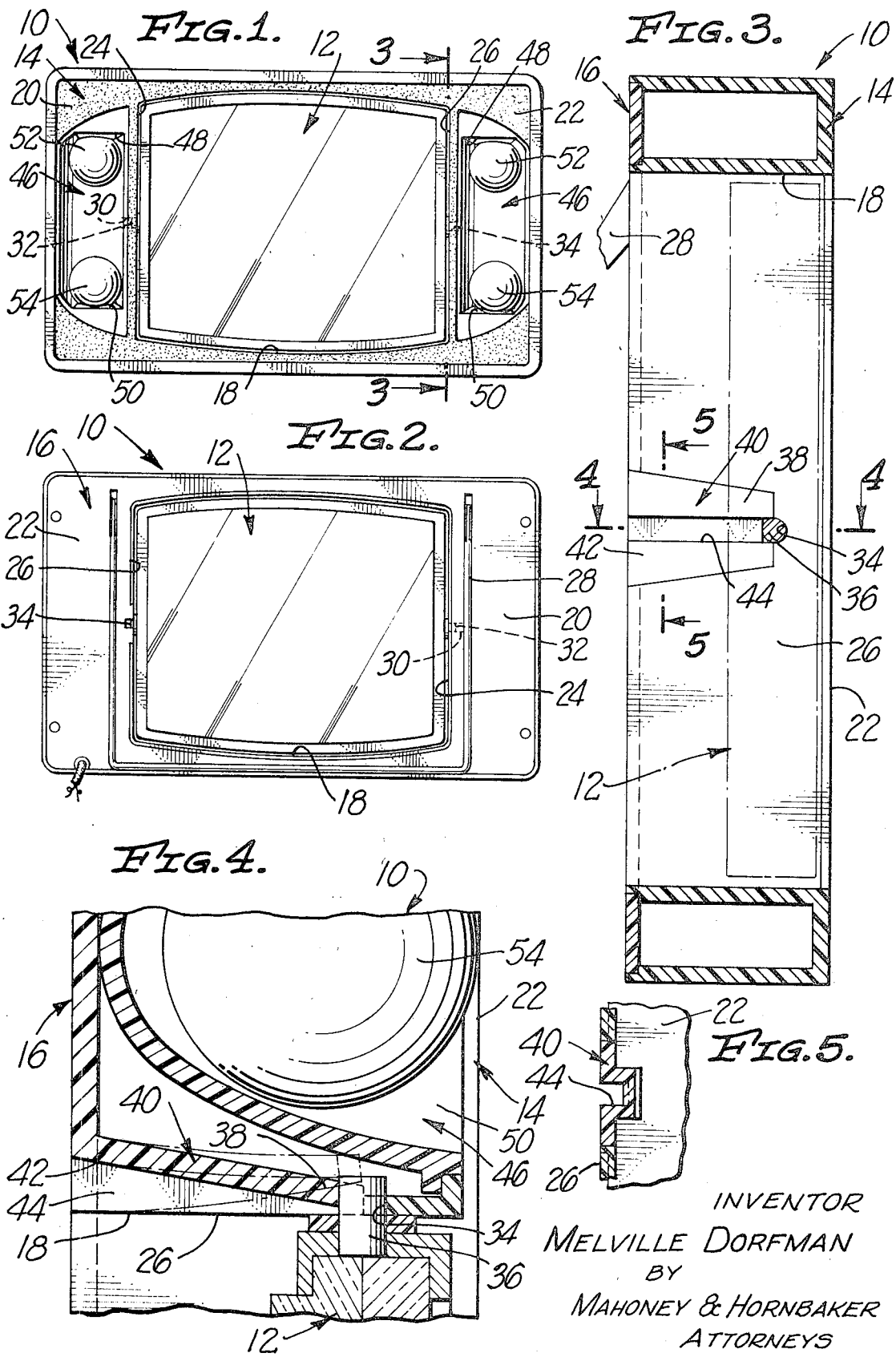

3,526,763
ELECTRICALLY ILLUMINATED PORTABLE COSMETIC MIRROR
Melville Dorfman, Beverly Hills, Calif., assignor, by mesne assignments, to Hartman Products, North Hollywood, Calif., a corporation of California
Filed Feb. 15, 1968, Ser. No. 705,835
Int. Cl. F21v 33/00
U.S. Cl. 240—4.2          4 Claims

ABSTRACT OF THE DISCLOSURE

A case has a somewhat rectangular mirror opening formed therethrough bordered at opposite ends by vertically elongated reflectors recessed in a forward surface thereof. The upper and lower ends of the reflectors have sockets adapted for receiving electric light bulbs projecting into the reflectors. A mirror is pivoted in the case mirror opening by pin and socket connections between mirror and case opposite ends, one of said connections being selectively pressure releasable for removing the mirror from the case.

BACKGROUND OF THE INVENTION

This invention relates to an electrically illuminated portable cosmetic mirror of the type wherein a portable case has a mirror opening formed therethrough, with a mirror pivotally mounted in said mirror opening and electrically energized illuminating means adjacent the mirror opening for providing illumination during use of the mirror. More particularly, this invention relates to a portable cosmetic mirror of the foregoing character providing unique pivotal connection means for the pivotal mirror permitting selective removal and replacement of the mirror in the event of damage thereto. Also more particularly, the present invention involves a portable cosmetic mirror of the foregoing general character having improved illuminating means superior to that of the prior constructions.

Various prior forms of portable cosmetic mirrors have been provided, certain of which have also included built-in electrical illumination for illuminating the usable surfaces of the mirror and the area of the person using the same. Such portable cosmetic mirrors have frequently included a mirror pivotally mounted in a mirror opening of a surrounding case, the mirror usually having opposite plain and magnifying surfaces so that the pivotal mounting thereof permits the selective use of the particular mirror side desired, while also permitting the mirror to be angled for the desired reflection therefrom. Also, the mirror illumination has usually consisted of a series of electrically actuated light bulbs mounted in the surfaces of the case at various locations surrounding the mirror, said light bulbs usually being recessed in various forms of reflectors for properly directing the illumination relative to the mirror surfaces and the person using the same.

One of the major difficulties with the prior portable cosmetic mirror constructions is occasioned by the fact that the mirrors, being portable mirrors mounted in a portable case, are extremely subject to accidental damage during the frequent transportation thereof. In view of the fact that the mirror must be mounted in the case for proper pivotal movement, it has been impossible with the prior constructions to replace the mirror in the event of accidental damage thereto without, at least, resorting to the services of a skilled serviceman and at relatively high resulting expense. As a consequence thereof, no attempts have been made in the design of the prior constructions for such mirror replacement and where the mirror is damaged to the point of no longer being usable, the entire portable mirror construction is usually discarded and a new one purchased, again resulting in relatively high costs to the consumer.

Another feature lacking in the prior portable cosmetic mirror constructions is that of truly proper illumination for the mirror surfaces being used and the person making use of the same. Obviously, proper illumination is extremely important and particularly to a person applying various of the cosmetics in order to insure a proper resulting aesthetic appeal. With the prior constructions, there has not been a sufficient effort made to provide the maximum of illumination within the space limitations of a portable mirror construction resulting in such prior constructions being somewhat lacking in this respect.

OBJECTS AND SUMMARY OF THE INVENTION

It is, therefore, an object of my invention to provide an electrically illuminated portable cosmetic mirror wherein a unique pivotal arrangement is constructed between the mirror and its surrounding case which permits relatively easy selective removal of the mirror from the case for any desired purpose, including accidental damage thereto wherein replacement thereof would be desirable. A mirror opening is formed through the case and the mirror is preferably end pivotally mounted within said mirror opening for not only selected angular pivoting of the mirror relative to the case for proper direction of the mirror during use by a person, but also pivotal 360° so that opposite sides of the mirror may be selected, one side being a plain mirror and the other side being a magnifying mirror. More particularly to the improvements of the present invention, at least one of the end pivotal connections between the mirror and case is arranged for selective pressure disconnection of said pivotal connection so that the mirror may be selectively removed from the case by virtually anyone desiring to do so in a matter of seconds so as to permit easy removal and replacement thereof.

It is a further object of my invention to provide an electrically illuminated portable cosmetic mirror of the foregoing general character wherein a unique form of illuminating means is arranged recessed within the case surfaces adjacent the ends of the mirror supplying far superior illumination than has been present with the prior constructions. In the construction of the present invention, a vertically elongated reflector is recessed in the case surfaces adjacent each of the mirror ends, each reflector having an electric light bulb mounted at the upper and lower ends thereof and projecting into the recessed confines of said reflector. The result is that a maximum of reflector surface is provided within the space limitations of the portable cosmetic mirror case and a maximum of usable illumination is thereby provided, far greater than that heretofore possible.

Other objects and advantages of the invention will be apparent from the following specification and the accompanying drawing which is for the purpose of illustration only.

BRIEF DESCRIPTION OF THE DRAWING

FIG. 1 is a front elevational view of an embodiment of electrically illuminated portable cosmetic mirror incorporating the principles of the present invention;

FIG. 2 is a rear elevational view of the mirror of FIG. 1;

FIG. 3 is an enlarged, fragmentary, vertical, sectional view looking in the direction of the arrows 3—3 in FIG. 1;

FIG. 4 is an enlarged, fragmentary, horizontal, sectional view looking in the direction of the arrows 4—4 in FIG. 3; and FIG. 5 is a fragmentary, vertical, sectional view looking in the direction of the arrows 5—5 in FIG. 3.

DESCRIPTION OF THE BEST EMBODIMENT CONTEMPLATED

Referring to the drawing, an embodiment of the electrically illuminated portable cosmetic mirror is shown and includes a case, generally indicated at 10, and a mirror, generally indicated at 12. The case 10 is generally rectangular in forward and rearward elevation, and relatively narrow in its vertical extension, being formed of usual materials, such as plastic, metal and the like, except where preferred materials are hereinafter particularly pointed out. The mirror 12 is a bordered mirror having opposite reflective sides, one preferably being a plain mirror and the other preferably being a magnifying mirror, as is common in cosmetic mirror constructions.

More particularly to the details of the case 10, said case includes forward and rearward vertical sides 14 and 16, with a somewhat rectangular mirror opening 18 extending totally between said sides. The mirror opening 18 is dimensioned such that the case 10 in vertical plane normally forms a complete enclosure for the mirror 12, with the case projecting horizontally from the mirror opening to define horizontally broadened, enclosing, opposite case ends 20 and 22 terminating inwardly in generally vertical, forwardly and rearwardly extending inner end surfaces 24 and 26, respectively. The case rearward side 16 may be provided with a usual, generally U-shaped stand 28 pivotal thereon for selectively supporting the case 10 and its enclosed mirror 12 in the usual rearwardly angled position while resting on a horizontal supporting surface, all in the usual manner.

The inner end surface 24 of the case end 20 is formed preferably midway of the vertical height thereof with a usual horizontal socket opening 30 for pivotally receiving a horizontal pivot pin 32 projecting endwise from the mirror 12. The inner end surface 26 of the case end 22 is, on the other hand, formed with a very particularly constructed horizontal socket opening 34 in the same vertical midway location and most important to the principles of the present invention. The socket opening 34 of the case end 22 normally pivotally receives a similar horizontal pivot pin 36 of the mirror 12 endwise therein so that the case socket openings 30 and 34 co-operate with the mirror pivot pins 32 and 36 to pivotally mount the mirror 12 selectively pivotal merely small degrees from extending straight vertically within the case mirror opening 18, or pivotal 360° so that the mirror may be positioned with either the plain or magnifying side projecting forwardly.

The particulars of the unique construction of the socket opening 34 in the inner end surface 26 of the case end 22 are best seen in FIGS. 3, 4 and 5. As shown, preferably the forward half of said socket opening 34 is formed stationary in the case inner end surface 26, whereas the rearward half thereof is formed at a free end 38 of a selectively horizontally depressible, cantilever mounted spring tab or strip 40. The spring tab 40 is preferably formed of plastic and is horizontally movably received in a corresponding opening 42 through the case inner end surface 26.

The rearward end 42 of the spring strip 40 is secured to the case rearward side 16, preferably being integrally connected thereto so that said strip bends horizontally about the case rearward side, flexing throughout the horizonal length thereof. As a result of the flexing of the spring strip 40, occasioned by the selective depression of the spring strip free end 38 merely by finger pressure, such free end may be moved horizontally inwardly of the case inner end surface 26 to nearly completely axially clear the mirror pivot pin 36 and free said pivot pin with that mirror end for horizontal rearward movement out of the case mirror opening 18.

A guide groove or channel 44 is formed in the spring strip 40 horizontally aligned with the socket opening 34 and extending horizontally angularly from greater horizontal depth at the case rearward side 16 to lesser depth at the socket opening 34.

Thus, with the spring strip 40 released and in its normal position, said spring strip effectively completes the socket opening 34 rearwardly radially blocking the mirror pivot pin 36 so as to retain said pivot pin in said socket opening and properly pivotally mount the mirror 12 within the mirror opening 18 of case 10. When, however, the free end 38 of the spring strip 40 is depressed horizontally inwardly, as shown by the phantom lines in FIG. 4, the mirror pivot pin 36 may pass horizontally rearwardly into the spring strip guide channel 44 so that pivot pin 36 and that end of the mirror 12 may be selectively moved rearwardly out of the case mirror opening 18, the opposite mirror end pivot pin 32 being removed from the case socket opening 30 merely by appropriate endwise movement of the mirror.

Reassembly of a new mirror 12 into the case mirror opening 18 is accomplished simply by first engaging the pivot pin 32 into the socket opening 30 and then horizontally sliding the pivot pin 36 into the rearward end 42 of the spring strip guide channel 44, with appropriate movement of the mirror 12 causing pivot pin 36 to slide lengthwise of the spring strip guide channel 44 depressing the spring strip free end 38 so as to ultimately position the pivot pin 36 in the socket opening 34 and rearwardly blocked by the spring strip free end 38, as previously described.

As clearly shown in FIGS. 1 and 4, the opposite case ends 20 and 22 at the case forward side 14 are each provided with a recessed, vertically elongated reflector 46, said reflectors being merely the reverse of each other and otherwise virtually identical. As shown, each reflector 46 is recessed fully within the case forward side 14 at its particular case end 20 or 22 and adjacent the mirror opening 18. Furthermore, each reflector 46 is arcuate in horizontal cross section uniformly substantially throughout the vertical length thereof, terminating vertically in nearly horizontal, flat, upper and lower recessed ends 48 and 50.

Mounted totally within the inner confines of the case 10 are a pair of usual electric light bulb sockets, not shown, which open through the reflector upper and lower ends 48 and 50, serving to vertically mount upper and lower electric light bulbs 52 and 54. The upper and lower light bulbs 52 and 54 are preferably of the usual spherical configuration, projecting vertically from the reflector upper and lower ends 48 and 50 into the confines of said recessed reflector 46. In view of the fact that the light bulbs 52 and 54 are virtually surrounded by the reflective surface of the reflector 46 and the reflector is elongated providing reflective surface extending vertically between said light bulbs and totally across each of the ends of the mirror 12, maximum illumination for the mirror 12 is provided, as well as illumination for the person using said mirror.

Thus, according to the principles of the present invention, I have provided an electrically illuminated portable cosmetic mirror wherein the case enclosed, pivotal mirror 12 is selectively removable from its enclosing case 10 by pressure releasable means in the form of the spring strip 40 so that said mirror may be removed and replaced in the event the same becomes damaged. It is pointed out that the selective removal of the mirror 12 from the case 10 may be accomplished merely by simple finger pressure by anyone, so that the removal and replacement of the mirror 12 does not require the services of an expert mechanic. Furthermore, according to the present invention, I have provided improved illumination for the mirror 12 by the continuous, vertically elongated side reflectors 46 mounting electric light bulbs 52 and 54, the elongated reflector configuration providing the maximum of reflectivity for properly illuminating the mirror 12 and a person using the same.

I claim:

1. In a portable cosmetic mirror, the combination of: a case having forward and rearward sides, a mirror opening formed entirely through said case between said sides and defining oppositely enclosing case ends; a mirror within said case mirror opening having opposite ends inwardly adjacent said case ends; and pin and socket connections between each of said mirror ends and each of said case ends pivotally mounting said mirror in said case mirror opening including pins on said mirror ends projecting into socket openings formed in said case ends, at least one of said pin and socket connections having selectively pressure releasable means for selectively disconnecting said pin and socket connections and permitting removal of said mirror from said case including a resilient depressible member forming a pin side enclosure part of one of said sockets normally closely blocking and retaining a corresponding of said pins in said socket by forming one side part of said socket and resiliently depressible endwise of said pin permitting side movement of said pin from said socket by removing side blocking of said pin.

2. A portable cosmetic mirror as defined in claim 1 in which said pressure releasable means depressible member includes a cantilever mounted resilient plastic strip extending from one of said case sides and having a free end forming said side enclosure part of said one of said sockets normally closely side blocking and retaining said pin in said socket, said resilient strip free end being depressible endwise of said pin for side opening said socket and permitting removal of said pin from said socket.

3. A portable cosmetic mirror as defined in claim 1 in which said pressure releasable means depressible member includes a cantilever mounted resilient plastic strip extending from one of said case sides and having a free end forming said side enclosure part of said one of said sockets normally closely side blocking and retaining said pin in said socket, said resilient strip free end being depressible endwise of said pin for side opening said socket and permitting removal of said pin from said socket, an elongated guide groove formed lengthwise of said resilient strip facing toward a mirror end opening at said strip free end into said socket guiding re-entry of said pin into said socket during depression of said resilient strip and re-entry of said pin into said socket.

4. A portable cosmetic mirror as defined in claim 1 in which a single, vertically elongated, recessed reflector is mounted in each of said case ends adjacent said mirror ends and recessed within said case forward side, each of said reflectors being generally U-shaped and substantially continuously arcuate in horizontal cross section with said arcuate cross section extending substantially uniformly between flat generally horizontal upper and lower ends, each of said reflector ends having socket means located for receiving electric light bulbs therein projecting vertically into the recessed confines of said reflectors and substantially horizontally midway of said reflector arcuate horizontal cross section.

References Cited

UNITED STATES PATENTS

| | | | |
|---|---|---|---|
| 1,948,112 | 2/1934 | Hoegger | 240—4.1 |
| 3,192,381 | 6/1965 | Zurawski et al. | 240—51.11 XR |
| 3,268,715 | 8/1966 | Rothman | 240—4.2 |
| 3,381,120 | 4/1968 | Fleisher et al. | 240—4.2 |

NORTON ANSHER, Primary Examiner

U.S. Cl. X.R.

350—305